United States Patent
Deka et al.

(10) Patent No.: US 11,578,743 B2
(45) Date of Patent: *Feb. 14, 2023

(54) MULTI-LAYER ENCAPSULATION SYSTEM FOR JOINT SEALING OF VACUUM INSULATED CABINETS

(71) Applicant: WHIRLPOOL CORPORATION, Benton Harbor, MI (US)

(72) Inventors: Lakshya J. Deka, Mishawaka, IN (US); Hua Liu, St. Joseph, MI (US); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,077

(22) Filed: Dec. 8, 2021

(65) Prior Publication Data

US 2022/0099124 A1    Mar. 31, 2022

Related U.S. Application Data

(60) Continuation of application No. 17/071,180, filed on Oct. 15, 2020, now Pat. No. 11,248,640, which is a division of application No. 16/308,524, filed as application No. PCT/US2017/017802 on Feb. 14, 2017, now Pat. No. 10,837,479.

(51) Int. Cl.
    *F16B 11/00* (2006.01)
    *F25D 23/08* (2006.01)
    *F25D 23/06* (2006.01)

(52) U.S. Cl.
    CPC ............ *F16B 11/006* (2013.01); *F25D 23/06* (2013.01); *F25D 23/065* (2013.01); *F25D 23/085* (2013.01); *F25D 2201/14* (2013.01)

(58) Field of Classification Search
    CPC ...... F25D 23/06; F25D 23/065; F25D 23/085; F25D 2201/14; F16J 15/022; F16B 11/006

See application file for complete search history.

(56) References Cited

U.S. PATENT DOCUMENTS

| | | | |
|---|---|---|---|
| 2,518,673 | A | 8/1950 | Ellsworth |
| 2,644,605 | A | 7/1953 | Palmer |
| 2,809,764 | A | 10/1957 | Diamond |
| 4,640,583 | A | 2/1987 | Hoshikawa et al. |
| 6,857,233 | B2 | 2/2005 | Farag |
| 7,832,160 | B2 | 11/2010 | Farag |
| 8,056,503 | B2 | 11/2011 | Kikuchi et al. |
| 8,387,562 | B2 | 3/2013 | Kikuchi et al. |

(Continued)

FOREIGN PATENT DOCUMENTS

| | | |
|---|---|---|
| KR | 20150089495 | 8/2015 |
| WO | 03009363 | 1/2003 |

(Continued)

*Primary Examiner* — Matthew W Ing
(74) *Attorney, Agent, or Firm* — Price Heneveld LLP

(57) ABSTRACT

An appliance includes an outer wrapper, an inner liner, a trim breaker having a channel that receives at least one of a wrapper edge of the outer wrapper and a liner edge of the inner liner, and a composite encapsulation system that hermetically seals an insulating cavity defined between the outer wrapper and the inner liner. The composite encapsulation system includes a base adhesive and an outer adhesive, wherein the base adhesive defines a structural adhesive component and the outer adhesive defines a sealing adhesive component.

20 Claims, 9 Drawing Sheets

(56) References Cited

U.S. PATENT DOCUMENTS

| | | |
|---|---|---|
| 8,484,916 B2 | 7/2013 | Farag |
| 8,904,957 B2 | 12/2014 | Kikuchi et al. |
| 9,437,402 B2 | 9/2016 | Kikuchi et al. |
| 10,473,217 B2 | 11/2019 | Deka et al. |
| 10,788,128 B2 | 9/2020 | Deka et al. |
| 2002/0041134 A1 | 4/2002 | Wolf et al. |
| 2010/0147443 A1 | 6/2010 | Utesch et al. |
| 2012/0104923 A1 | 5/2012 | Jung et al. |
| 2012/0205374 A1 | 8/2012 | Klumpen |
| 2015/0083332 A1 | 3/2015 | Kikuchi et al. |
| 2016/0258671 A1 | 9/2016 | Allard et al. |
| 2019/0128594 A1 | 5/2019 | Allard et al. |
| 2020/0040997 A1 | 2/2020 | Deka et al. |

FOREIGN PATENT DOCUMENTS

| | | |
|---|---|---|
| WO | 2011044569 | 4/2011 |
| WO | 2011058678 | 5/2011 |
| WO | 2016141021 | 9/2016 |
| WO | 2018022006 | 2/2018 |
| WO | 2018067108 | 4/2018 |

# MULTI-LAYER ENCAPSULATION SYSTEM FOR JOINT SEALING OF VACUUM INSULATED CABINETS

CROSS-REFERENCE TO RELATED APPLICATION

The present application is a continuation of U.S. patent application Ser. No. 17/071,180 filed Oct. 15, 2020, entitled MULTI-LAYER ENCAPSULATION SYSTEM FOR JOINT SEALING OF VACUUM INSULATED CABINETS, now U.S. Pat. No. 11,248,640, which is a divisional of U.S. patent application Ser. No. 16/308,524 filed Dec. 10, 2018, entitled MULTI-LAYER ENCAPSULATION SYSTEM FOR JOINT SEALING OF VACUUM INSULATED CABINETS, now U.S. Pat. No. 10,837,479, which is a national stage of International Application No. PCT/US2017/017802 filed Feb. 14, 2017, entitled MULTI-LAYER ENCAPSULATION SYSTEM FOR JOINT SEALING OF VACUUM INSULATED CABINETS, now International Publication No. WO2018/151705, the entire disclosures of which are hereby incorporated herein by reference.

FIELD OF THE DEVICE

The device is in the field of insulation structures for appliances, and more specifically, a multi-layer encapsulation system for joint sealing within a vacuum insulated structure.

SUMMARY

In at least one aspect, an appliance includes an outer wrapper, an inner liner, a trim breaker having a channel that receives at least one of a wrapper edge of the outer wrapper and a liner edge of the inner liner, and a composite encapsulation system that hermetically seals an insulating cavity defined between the outer wrapper and the inner liner. The composite encapsulation system includes a base adhesive and an outer adhesive, wherein each of the base and outer adhesives define a structural component and a sealing component.

In at least another aspect, a method for forming an insulating cabinet for an appliance includes steps of delivering a base adhesive in an uncured state into a channel of a trim breaker. A wrapper edge of an outer wrapper is disposed into the channel so that the base adhesive in the uncured state surrounds both sides of the wrapper edge within the channel. A liner edge of an inner liner is disposed into the channel so that the adhesive base in the uncured state surrounds both sides of the liner edge within the channel. The base adhesive is cured. An outer adhesive is then disposed over the base adhesive. The outer adhesive covers the base adhesive and engages the outer wrapper and inner liner at the trim breaker. The outer adhesive is then cured. Once cured, the base adhesive and outer adhesive cooperate to define structural and sealing components of the composite encapsulation system.

In at least another aspect, a method for forming an insulating cabinet for an appliance includes steps of delivering a base adhesive in an uncured state into a wrapper channel and a liner channel of a trim breaker. A liner edge of an inner liner is disposed into the liner channel so that the base adhesive in the uncured state surrounds both sides of the liner edge within the liner channel. A wrapper edge of an outer wrapper is disposed into the wrapper channel so that the base adhesive in the uncured state surrounds both sides of the wrapper edge within the wrapper channel. The base adhesive is cured to define a structural adhesive component. A medial buffer layer is disposed onto at least a portion of the cured base adhesive. An outer adhesive is disposed over the medial buffer layer, wherein the outer adhesive extends from an outer edge of the trim breaker to an outside surface of the outer wrapper and also extends from an inner edge of the trim breaker to an inside surface of the inner liner. The outer adhesive is cured to define a composite encapsulation system having the base adhesive and the outer adhesive that define structural and sealing components, wherein the base adhesive and the outer adhesive are separated by the medial buffer layer.

These and other features, advantages, and objects of the present device will be further understood and appreciated by those skilled in the art upon studying the following specification, claims, and appended drawings.

DETAILED DESCRIPTION OF EMBODIMENTS

Figure 1:
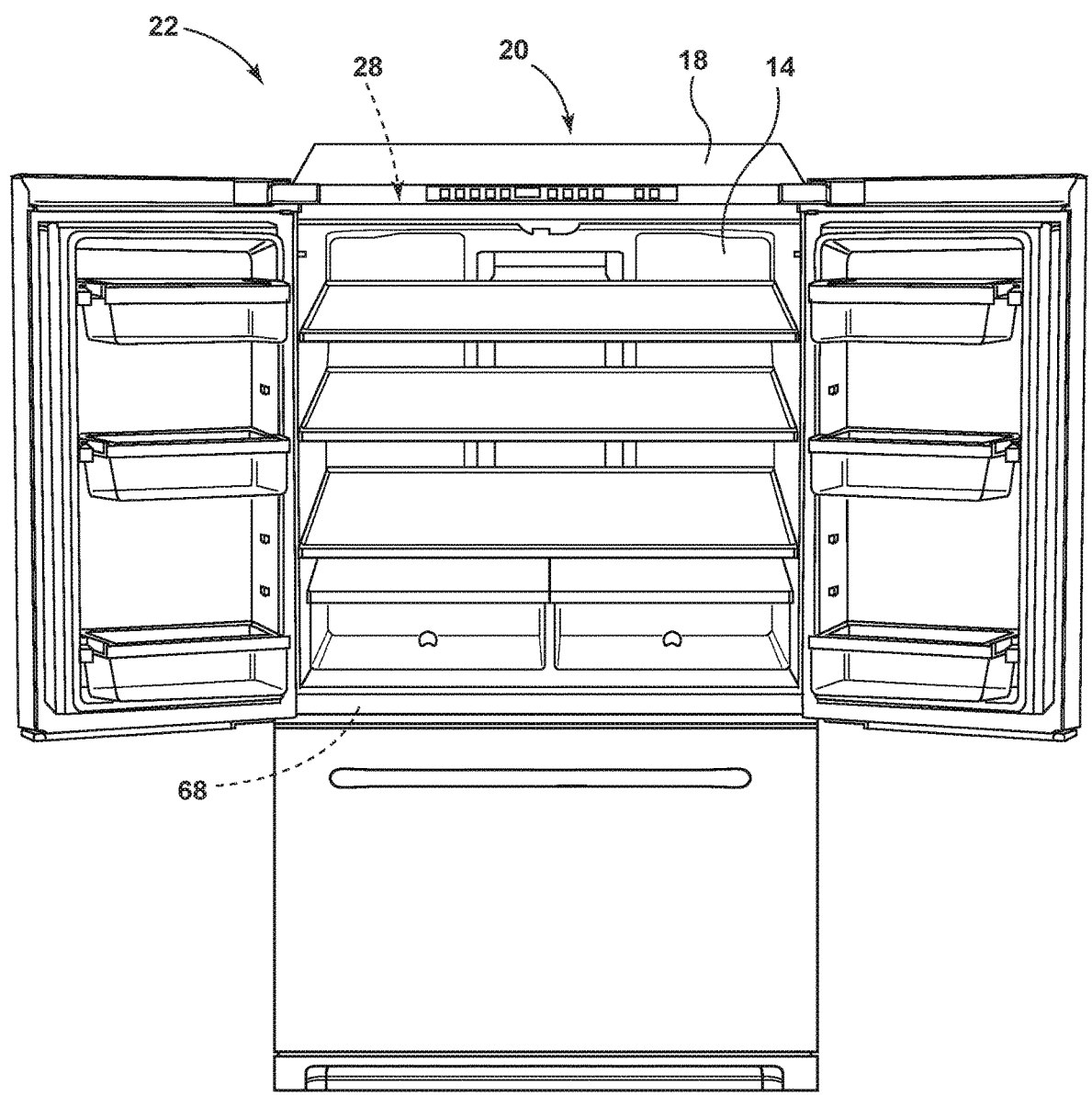
FIG. 1 is a front perspective view of an appliance having a cabinet that incorporates an aspect of the multi-layer encapsulation system.
Figure 2:
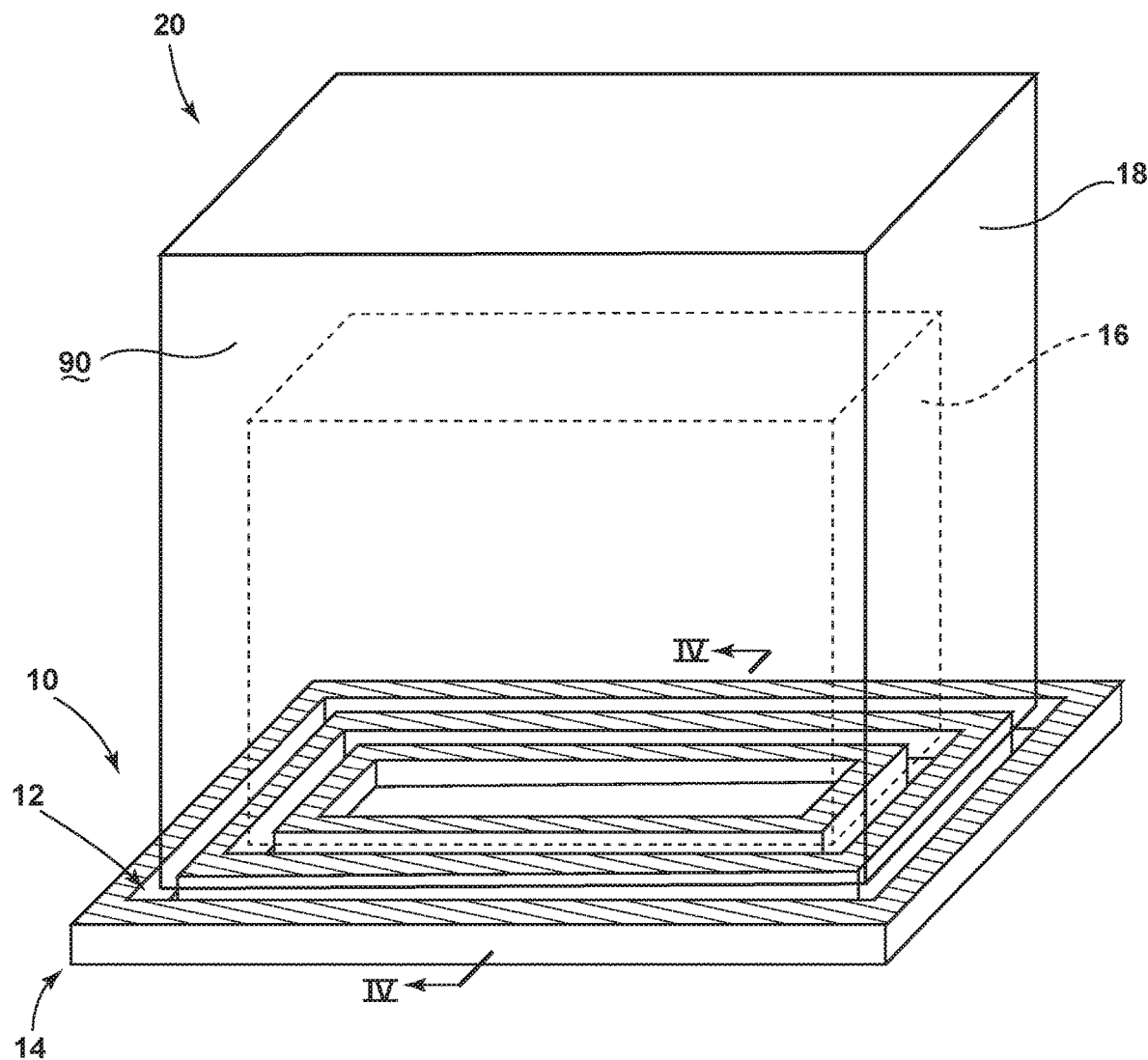
FIG. 2 is a schematic diagram illustrating a cabinet incorporating an aspect of the multi-layer encapsulation system.
Figure 3:
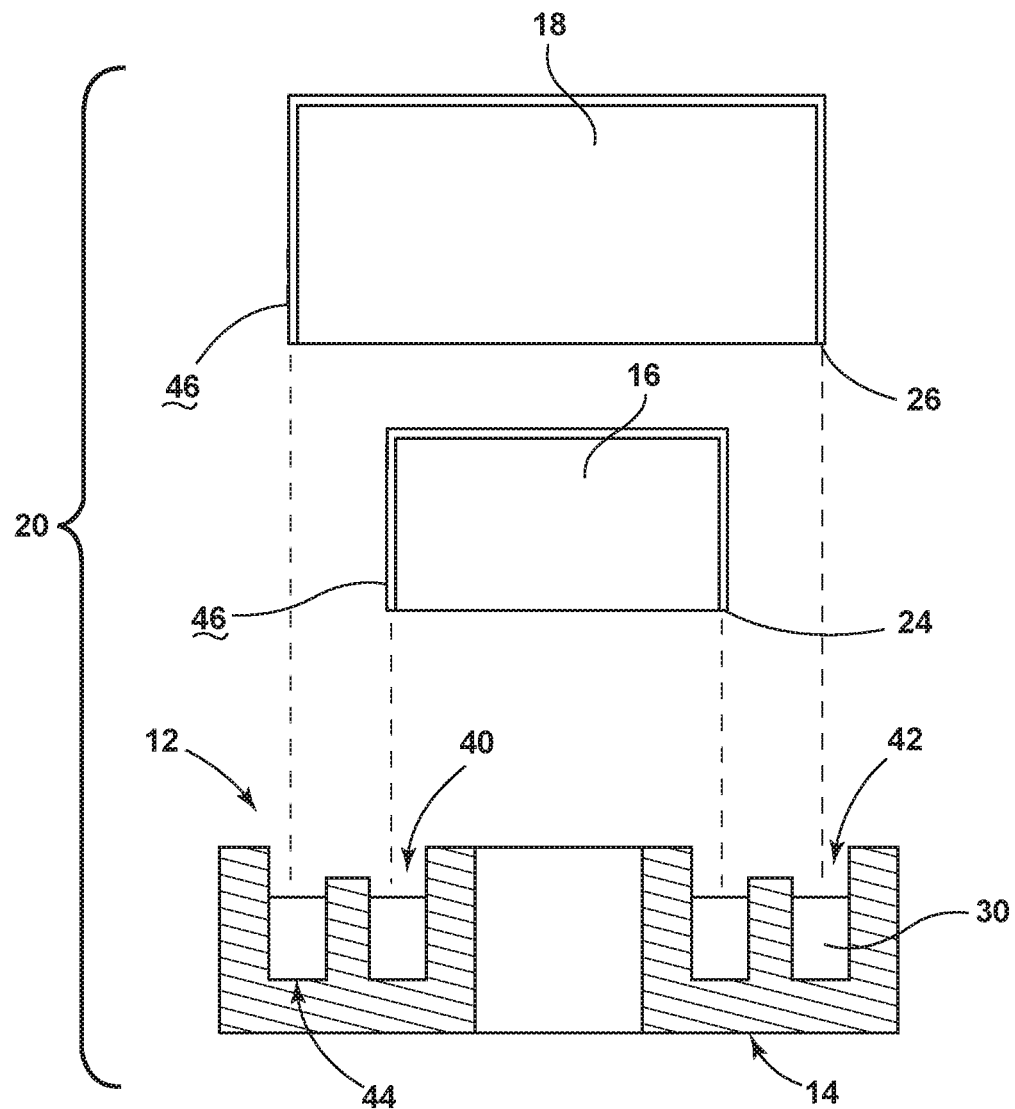
FIG. 3 is an exploded schematic cross-sectional view of an appliance cabinet incorporating an aspect of the multi-layer encapsulation system.
Figure 5:
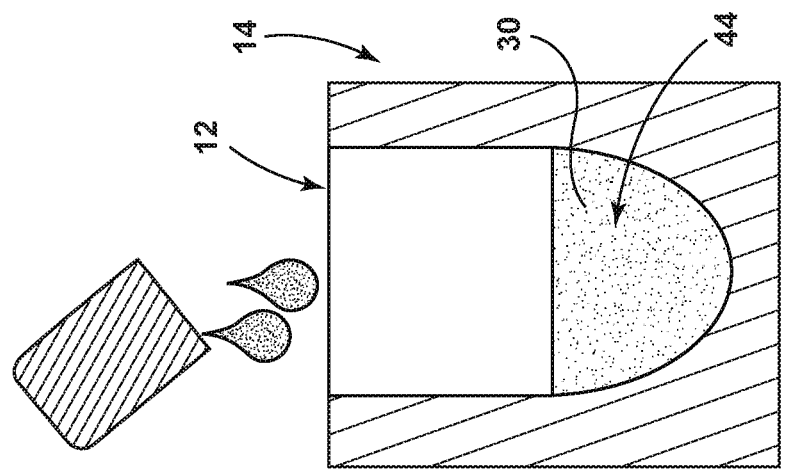
FIG. 5 is a schematic view of a trim breaker receiving a base adhesive in an uncured state as part of the process for forming the multi-layer encapsulation system.
Figure 4:
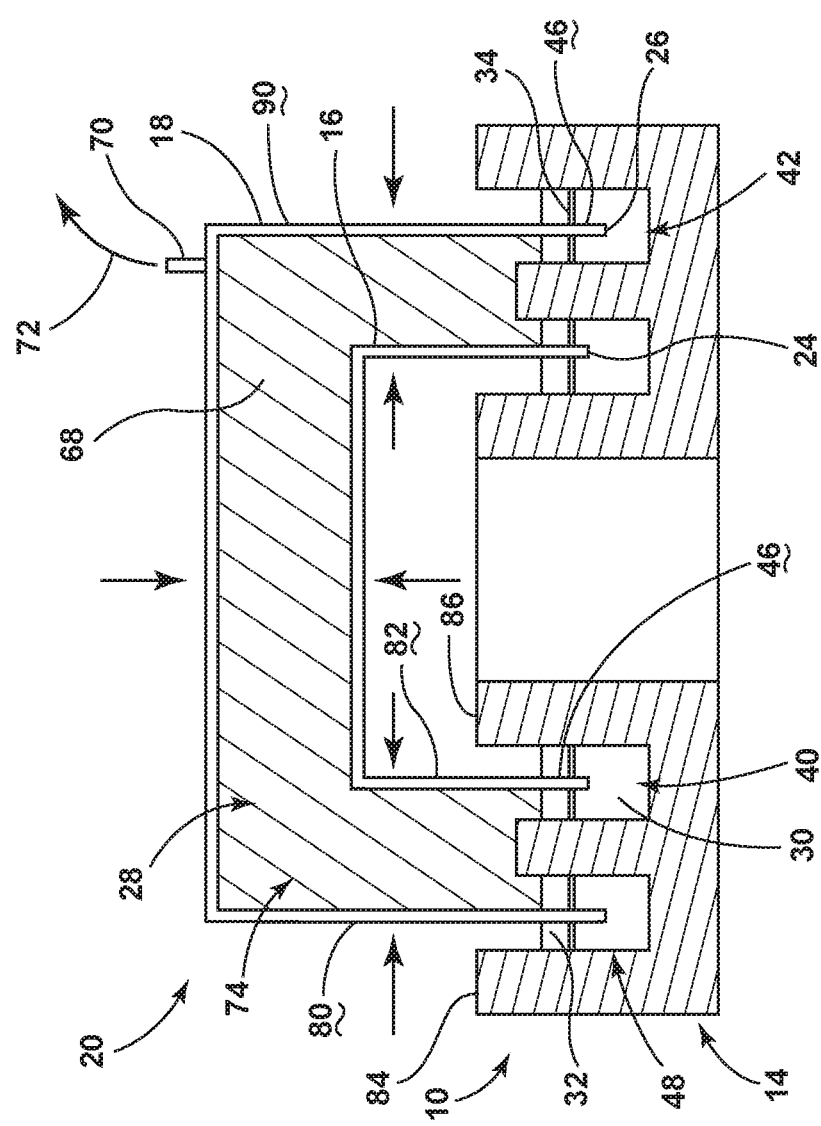
FIG. 4 is a cross-sectional view of the schematic appliance cabinet of FIG. 2, taken along line IV-IV, and illustrating a process for evacuating gas from an insulating cavity of the cabinet.
Figure 7:
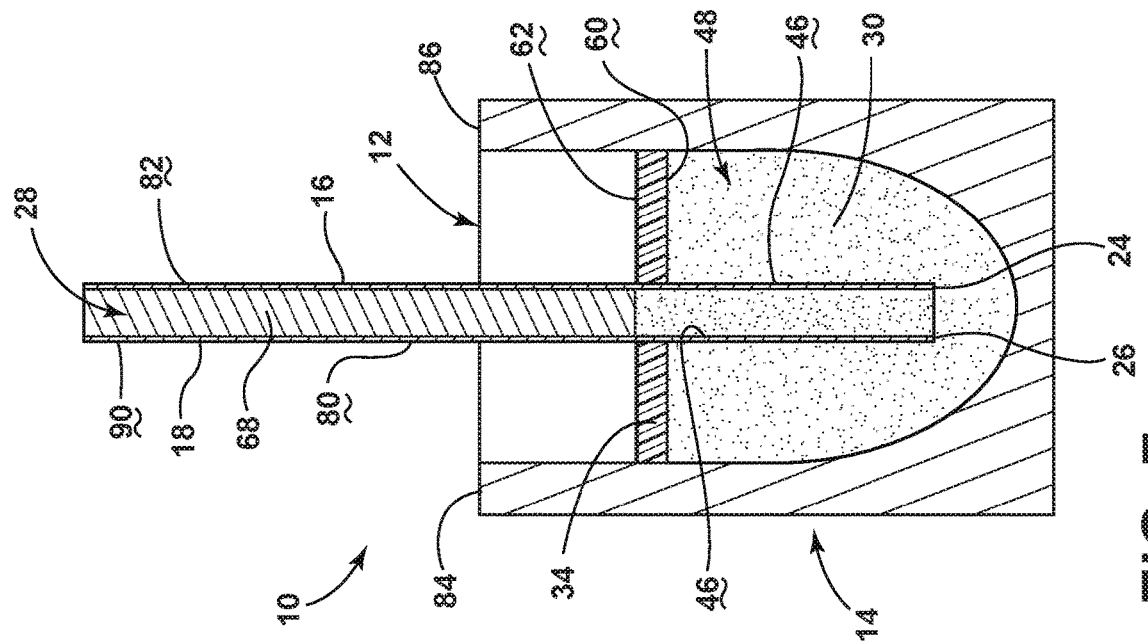
FIG. 7 is a cross-sectional view of the trim breaker of FIG. 6 and showing the medial buffer layer disposed onto the base adhesive.
Figure 6:
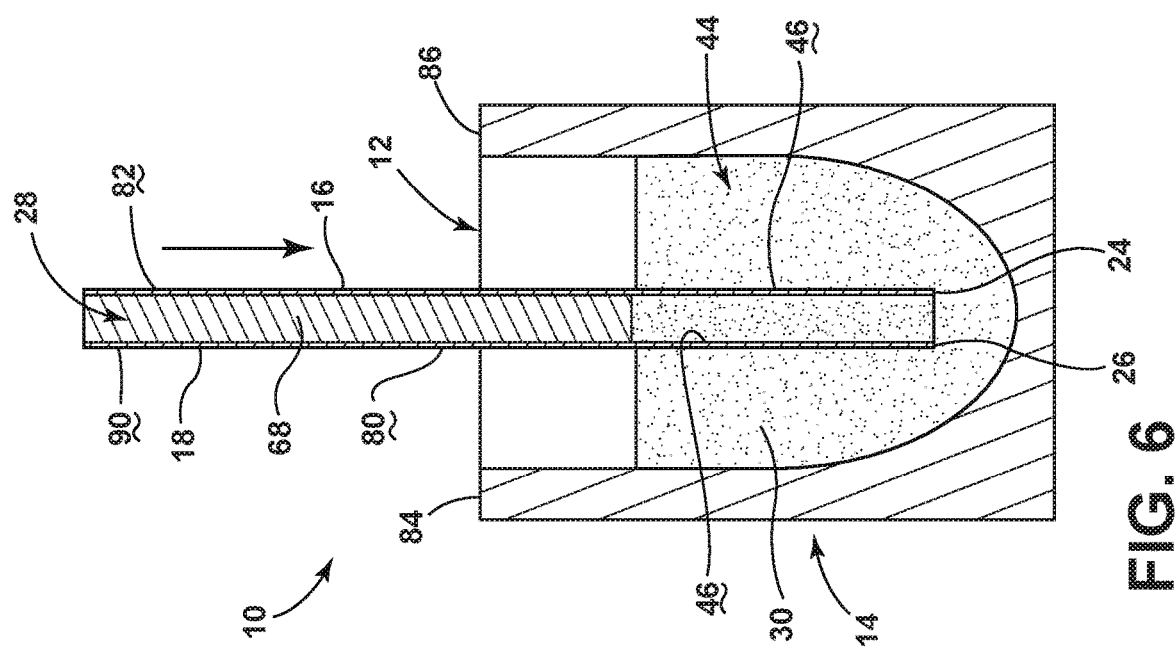
FIG. 6 is a schematic cross-sectional view of the trim-breaker of FIG. 5 showing the inner liner and outer wrapper being disposed within the base adhesive in the uncured state.
Figure 8:
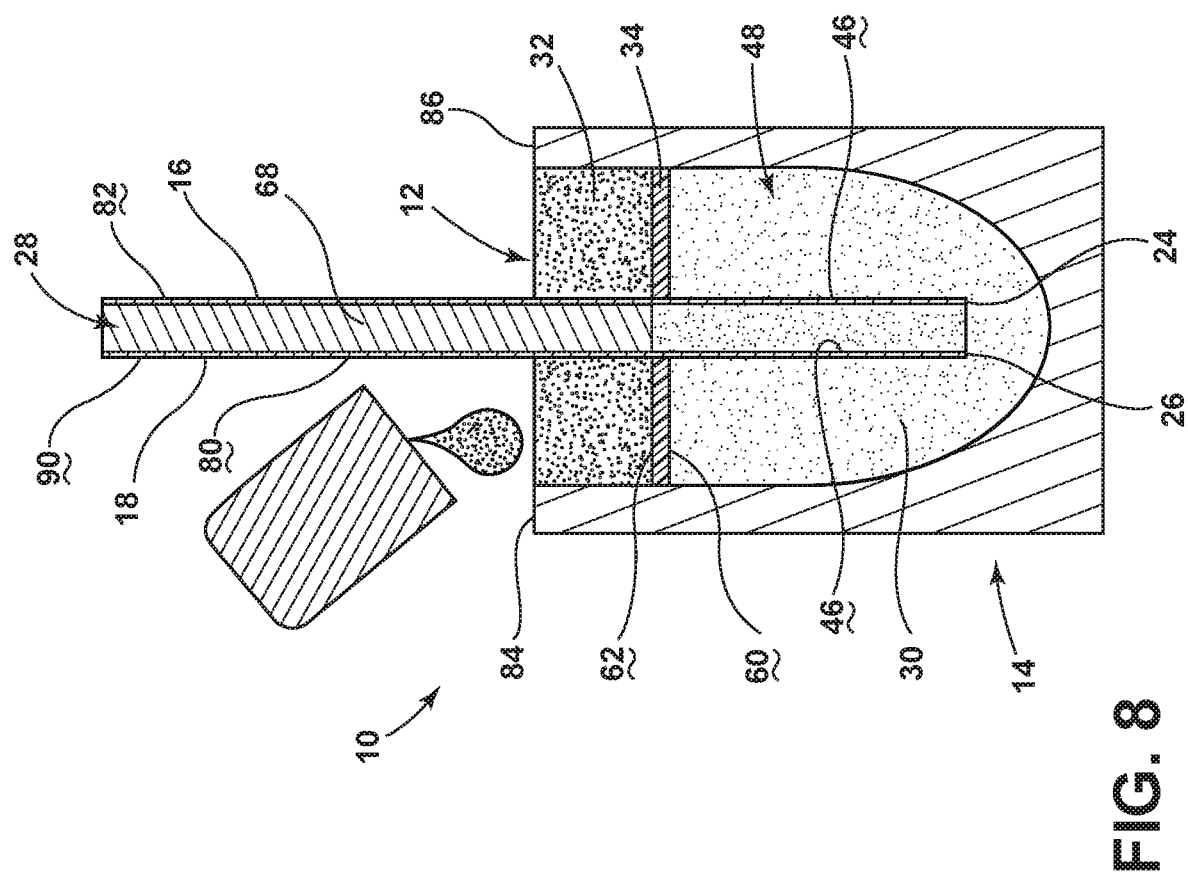
FIG. 8 is a cross-sectional view of the trim breaker of FIG. 7 and showing the outer adhesive disposed over the medial buffer layer.
Figure 10:
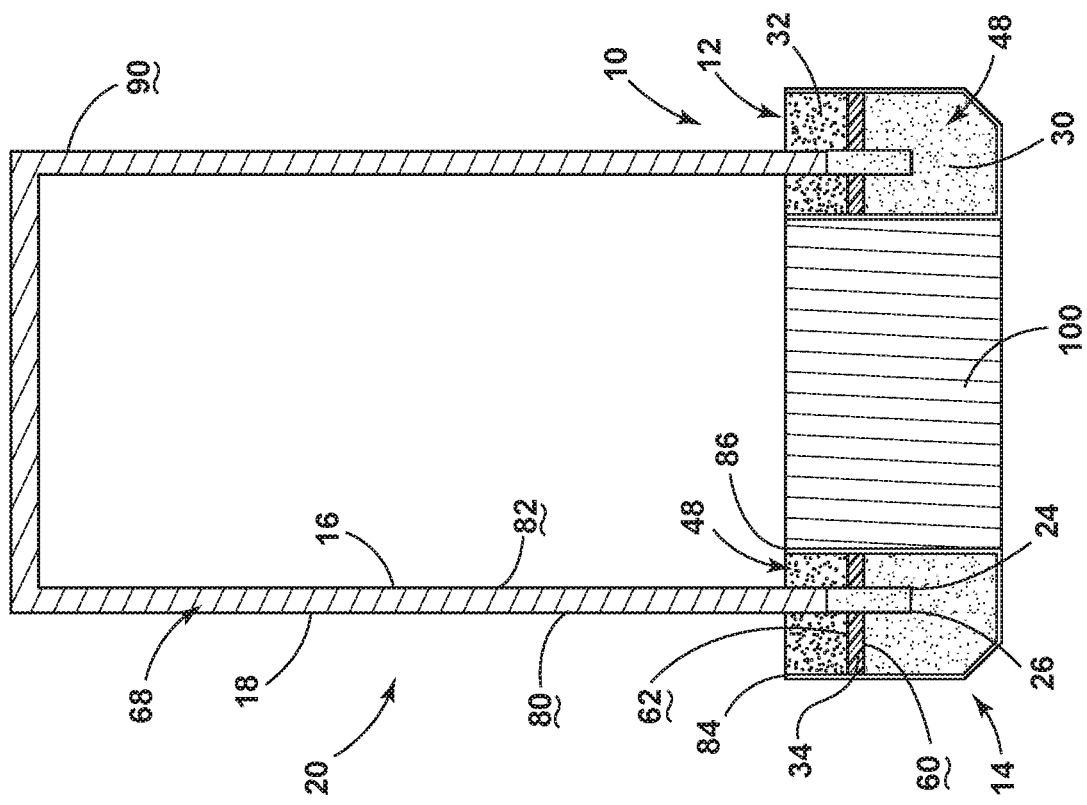
FIG. 10 is a cross-sectional view of the cabinet of FIG. 9 and showing the multi-layer encapsulation system for securing the inner liner and outer wrapper to the trim breaker.
Figure 9:
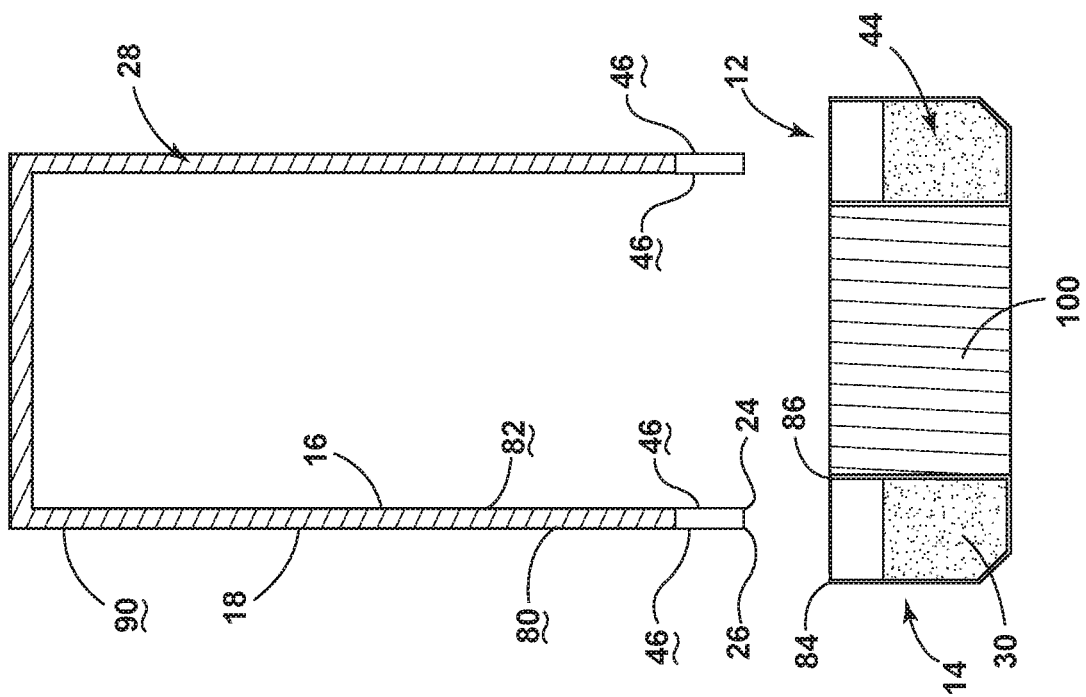
FIG. 9 is a schematic cross-sectional view of an inner liner and outer wrapper being disposed within an aspect of the trim breaker for creating the multi-layer encapsulation system.
Figure 11:
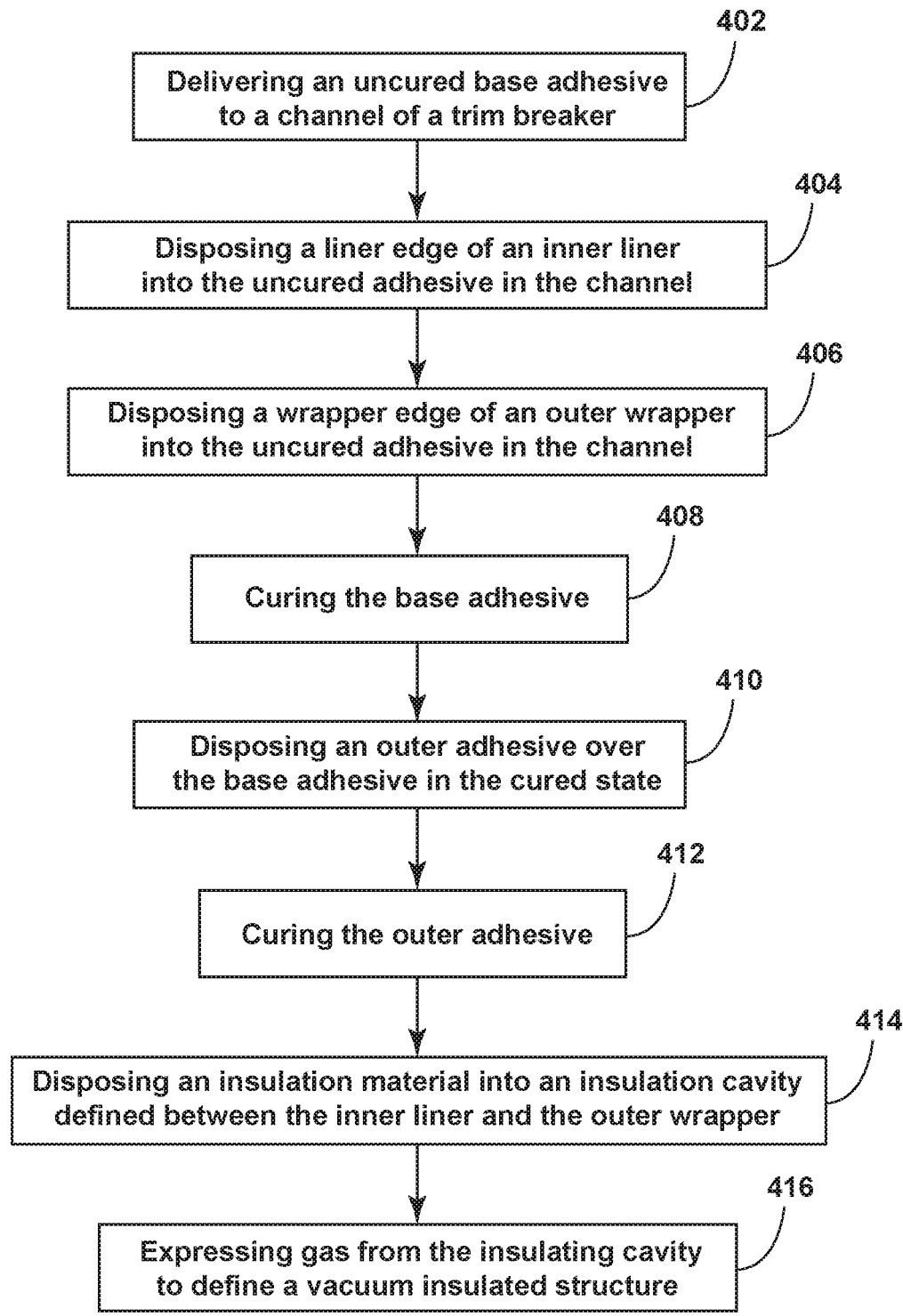
FIG. 11 is a schematic flow diagram illustrating a method for forming an insulating cabinet for an appliance.
Figure 12:
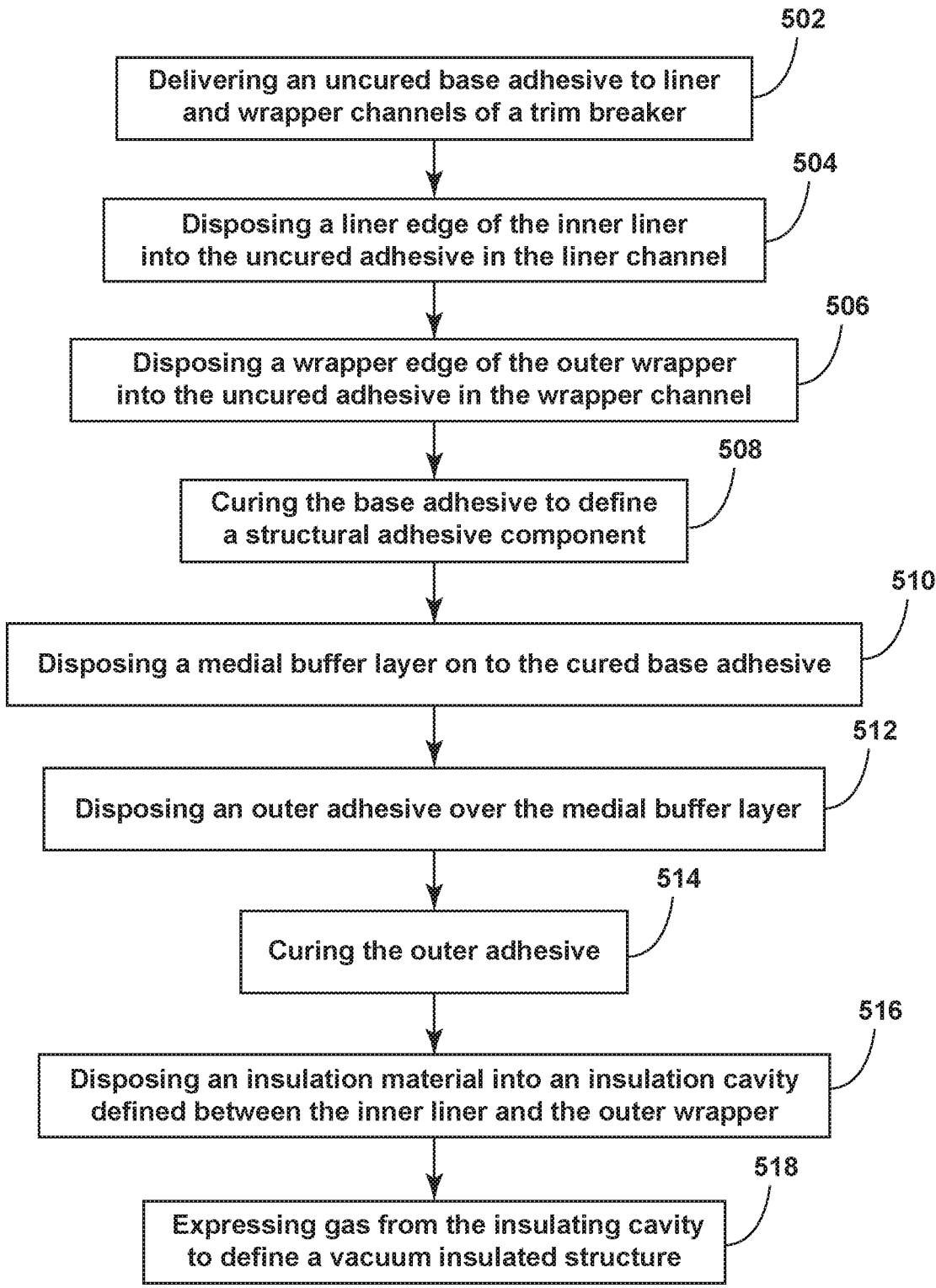
FIG. 12 is a schematic flow diagram illustrating a method for forming an insulating cabinet for an appliance.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary.

It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-4, reference numeral 10 generally refers to a multi-layer encapsulation system that is disposed within a channel 12 of a trim breaker 14 for securing an inner liner 16 and an outer wrapper 18 to the trim breaker 14 for forming a structural cabinet 20 for an appliance 22. According to the various embodiments, the appliance 22 can include the inner liner 16 and the outer wrapper 18. The trim breaker 14 includes the channel 12 that receives at least one of the liner edge 24 of the inner liner 16 and the wrapper edge 26 of the outer wrapper 18. A composite encapsulation system 10 is included that hermetically seals an insulating cavity 28 defined between the outer wrapper 18 and the inner liner 16. The composite encapsulation system 10 includes a base adhesive 30 and an outer adhesive 32. The base and outer adhesive 30, 32 each define, respectively, structural adhesive components and sealing adhesive components. According to various aspects of the device, the base and outer adhesives 30, 32 are separated by a medial buffer layer 34. The medial buffer layer 34 is adapted to prevent direct contact between the base and the outer adhesives 30, 32. Accordingly, it is contemplated that the outer adhesive 32 is injected, poured, sprayed or otherwise disposed over the medial buffer layer 34 to be physically separated from direct contact with the base adhesive 30 by the medial buffer layer 34.

The medial buffer layer 34 that is included within aspects of the composite encapsulation system 10 is typically included where the base adhesive 30 and outer adhesive 32 have chemical compositions that are not compatible in the event of direct contact. In such an embodiment, the chemical make-up of the base adhesive 30 may react negatively with the outer adhesive 32, and/or vice versa. In order to prevent this negative deterioration of either of the base or outer adhesives 32, the medial buffer layer 34 is included to prevent this physical contact. The inclusion of the medial buffer layer 34 allows for the use of a wide range of adhesives and/or sealing materials that may not otherwise be able to be used due to incompatible chemistries of the various materials. Additionally, the medial buffer layer 34 may also provide additional resistance to permeability for the entire composite encapsulation system 10, while also preventing negative chemical reactions between the base adhesive 30 and outer adhesive 32.

Referring now to FIGS. 1-8, it is contemplated that the channel 12 can include a wrapper channel 42 that receives the liner edge 24 of the inner liner 16. The channel 12 can also include a separate wrapper channel 42 that is adapted to receive the wrapper edge 26 of the outer wrapper 18. In various alternative aspects, it is contemplated that the trim breaker 14 can include a single channel 12 that receives both the wrapper edge 26 of the outer wrapper 18 and the liner edge 24 of the inner liner 16. In these various embodiments, it is contemplated that the inner liner 16 and outer wrapper 18 are disposed within the channel 12 while the base adhesive 30 is in a substantially viscous and uncured state 44. In this manner, the base adhesive 30 has a sufficient viscosity to form around the wrapper edge 26 and the liner edge 24 such that the base adhesive 30 engages both sides 46 of the inner liner 16 and outer wrapper 18. Accordingly, the base adhesive 30 occupies at least a portion of the insulating cavity 28 between the inner liner 16 and the outer wrapper 18. This surrounding engagement provides a robust engagement of the base adhesive 30 with the inner liner 16 and outer wrapper 18. The outer adhesive 32 can then be applied over the base adhesive 30. Typically, the outer adhesive 32 is applied after the base adhesive 30 defines a cured state 48. Typically, the base adhesive 30 forms a structural adhesive component for the composite encapsulation system 10. After the outer adhesive 32 cures, the outer adhesive 32 can define a sealing adhesive component of the composite encapsulation system 10. Additionally, the outer adhesive 32 can provide an additional structural component to provide a more robust attachment between the trim breaker 14 and the inner liner 16 and outer wrapper 18. It should be understood that the base and outer adhesives 30, 32 can each provide structural and sealing functionality to the composite encapsulation system 10.

Referring again to FIGS. 2-8, the medial buffer layer 34 can be in the form of a solid member that is disposed over the base adhesive 30, which is, typically, in the cured state 48. It is also contemplated that the medial buffer layer 34 can be a spray-type material that is disposed over the base adhesive 30 in the cured state 48. In this manner, the base adhesive 30 is adapted to engage a lower surface 60 of the medial buffer layer 34. Depending upon the nature of the medial buffer layer 34 and the state (cured state 48 or uncured state 44) of the base adhesive 30, the base adhesive 30 may bond to the lower surface 60 of the medial buffer layer 34. Alternatively, the medial buffer layer 34 may rest upon, in a substantially surface-type engagement with, the base adhesive 30. The outer adhesive 32 is then applied to the upper surface 62 of the medial buffer layer 34 such that the outer adhesive 32 bonds, adheres to, or otherwise engages the upper surface 62 of the medial buffer layer 34 to define the composite encapsulation system 10. Once the base adhesive 30 and the outer adhesive 32 are in the cured state 48, the base adhesive 30, the medial buffer layer 34 and the outer adhesive 32 cooperatively define the composite encapsulation system 10 that provides a substantially monolithic adhesive having an increased resistance to permeability of gas 72 and vapor over that of each of the individual components by themselves.

Referring again to FIGS. 2-8, it is contemplated that the elastic base can be an epoxy-type adhesive. The base adhesive 30, which is typically elastic, can also be in the form of other adhesives that can include, but are not limited to, acrylics, cyanoacrylates, polyurethanes, silicones, hybrids or combinations thereof, and other similar adhesives that may have a good barrier performance to block gas 72 (such as oxygen) and water vapor from permeating therethrough. This base adhesive 30 is adapted to encapsulate the plastic and metal joint area of the trim breaker 14 and inner liner 16 and outer wrapper 18 and provide hermetic sealing for the vacuum structure. The base adhesive 30 also provides a robust bond strength between the plastic of the trim breaker 14 and the metals of the outer wrapper 18 and/or the inner liner 16.

As discussed above, the medial buffer layer 34 could be a solid member that is placed on top of the base adhesive 30. It is contemplated that this medial buffer layer 34 can be in the form of a metallic or non-metallic sheet, a metallic-type coating, a non-metallic-type coating, various coatings that can be deposited through physical vapor deposition, spray-coatings, polymer-based coatings, elastomeric coatings, rubberized coatings, combinations thereof, and other similar barrier-type materials that can maintain the base adhesive 30 separate from the outer adhesive 32.

Referring again to FIGS. 2-8, the outer adhesive 32 can take the form of any one of various adhesives. Typically, the outer adhesive 32 will have elastic properties to allow for minimal movement of the inner liner 16 and outer wrapper 18 with respect to the trim breaker 14. These adhesives can include, but are not limited to, silicone adhesives, polyurethane adhesives, polymer-type materials, other silicone-type materials, combinations or hybrids thereof, and other similar materials that have a certain amount of elasticity to allow for movement of the inner liner 16 and outer wrapper 18 with respect to the trim breaker 14 during formation of the cabinet 20 and also during the life of the appliance 22. It is contemplated that the outer adhesive 32 has a robust attachment strength and also permeation resistance, such that if the base adhesive 30 experiences a de-lamination phenomenon, the outer adhesive 32 may be sufficient to the at least partial vacuum within the insulating cavity 28. Additionally, the outer adhesive 32 can define a protective layer that limits permeation to prevent significant amounts of humidity, gas 72 and vapor from reaching the base adhesive 30.

According to the various embodiments as exemplified in FIGS. 2-8, it is contemplated that an insulation material 68 can be disposed within the insulating cavity 28. Additionally, at least one of the inner liner 16 and outer wrapper 18 can include a gas port 70 that is used to express or expel gas 72 from the insulating cavity 28. In this manner, the insulating cavity 28 can define an at least partial vacuum 74 therein for increasing the insulating functionality of the cabinet 20.

Referring now to FIGS. 5-10, typically, the inner liner 16 and outer wrapper 18 are disposed within the base adhesive 30 before the medial buffer layer 34 and the outer adhesive 32 are disposed over the base adhesive 30. Accordingly, portions of the base adhesive 30 disposed within the insulating cavity 28 between the inner liner 16 and outer wrapper 18 may be substantially inaccessible. In various embodiments, the medial buffer layer 34 and the outer adhesive 32 are disposed, typically, at an outside surface 80 of the outer wrapper 18 and at an inside surface 82 of the inner liner 16. In this manner, the medial buffer layer 34 and the outer adhesive 32 extends from an outside edge 84 of the trim breaker 14 to an outside surface 80 of the outer wrapper 18 and also from an inside edge 86 of the trim breaker 14 to an inside surface 82 of the inner liner 16. In such an embodiment, it is contemplated that at least a portion of the insulation material 68 can at least partially engage the base adhesive 30 within the insulating cavity 28. At these outer portions of the trim breaker 14, the outer adhesive 32 is free of direct contact with the base adhesive 30. In general, where the base adhesives 30 are chemically incompatible or at least partially incompatible, the medial buffer layer 34 will be installed therebetween such that the outer adhesive 32 is free of direct contact with the base adhesive 30. To maintain the spacing and positioning of the trim breaker 14 and the channel 12, a pedal 100 holds the trim breaker 14 in a substantially fixed position.

In various embodiments, it is contemplated that the inner liner 16 and/or outer wrapper 18 can include a dedicated port that can be used for disposing the outer adhesive 32 and/or the medial buffer layer 34 over the base adhesive 30 and within the insulating cavity 28. Typically, the outer adhesive 32 and the medial buffer layer 34 will be disposed only proximate the exterior surface 90 of the cabinet 20 and between the trim breaker 14 and the inner liner 16 and the trim breaker 14 and the outer wrapper 18. In this position, the composite encapsulation system 10 that incorporates the base adhesive 30, the outer adhesive 32 and, in certain embodiments, the medial buffer layer 34, is positioned to significantly reduce the permeation of gas 72 and vapor into the insulating cavity 28. In turn, the composite encapsulation system 10 extends the duration of the at least partial vacuum 74 within the insulating cavity 28 and prolongs the life of the insulating functionality of the cabinet 20.

Referring now to FIGS. 1-11, having described various aspects of the composite encapsulation system 10, a method 400 is disclosed for forming an insulating cabinet 20 for an appliance 22. According to the method 400, a base adhesive 30 is delivered while in an uncured state 44 into a channel 12 of a trim breaker 14 (step 402). A liner edge 24 of the inner liner 16 is disposed into the channel 12 so that the adhesive base in the uncured state 44 surrounds both sides 46 of the liner edge 24 within the channel 12 (step 404). A wrapper edge 26 of an outer wrapper 18 is also disposed into the channel 12 so that the base adhesive 30 in the uncured state 44 surrounds both sides 46 of the wrapper edge 26 within the channel 12 (step 406). The base adhesive 30 is then cured (step 408). An outer adhesive 32 can be disposed over the base adhesive 30 (step 410). It is contemplated that the outer adhesive 32 covers the adhesive base and engages the outer wrapper 18 and inner liner 16 at the trim breaker 14. The outer adhesive 32 is then cured to define the composite encapsulation system 10 (step 412). The base adhesive 30 and the outer adhesive 32 each define structural and sealing components of the composite encapsulation system 10 that cooperate to reduce the permeation of gas 72 and vapor into the insulating cavity 28 of the cabinet 20. According to various aspects of the method 400, as exemplified in FIGS. 1-11, an insulation material 68 can be disposed within the insulating cavity 28 defined between the inner liner 16 and the outer wrapper 18 (step 414). Gas 72 can then be expressed from the insulating cavity 28 and the insulation material 68 defined within the insulating cavity 28 (step 416). In this manner, the expression or expulsion of gas 72 from the insulating cavity 28 defines an at least partial vacuum 74 therein. The base adhesive 30 and the outer adhesive 32 are at least partially elastic to provide for an at least partial movement of the inner liner 16 and the outer wrapper 18 without damaging or degrading the integrity of the encapsulation system 10. This movement is permitted while also maintaining the hermetic seal between the inner liner 16 and the trim breaker 14 and between the outer wrapper 18 and the trim breaker 14.

Referring now to FIGS. 1-10 and 12, a method 500 is disclosed for forming an insulating cabinet 20 for an appliance 22. According to the method 500, a base adhesive 30 is delivered in an uncured state 44 to the liner channel 40 and the wrapper channel 42 of the trim breaker 14 (step 502). The liner edge 24 of the inner liner 16 is disposed into the liner channel 40 (step 504). In this manner, the base adhesive 30 in the uncured state 44 and within the liner channel 40 is allowed to surround both sides 46 of the liner edge 24 within the liner channel 40. The wrapper edge 26 of the outer wrapper 18 is disposed into the wrapper channel 42 (step 506). Accordingly, the base adhesive 30 in the uncured state 44 which is disposed within the wrapper channel 42, surrounds both sides 46 of the wrapper edge 26 within the wrapper channel 42. The base adhesive 30 within the liner and wrapper channels 40, 42 is cured to define a structural adhesive component and also includes a sealing function for limiting permeation of gas 72 and vapor into the insulating cavity 28 of the cabinet 20 (step 508). Once the base adhesive 30 is cured, a medial buffer layer 34 is disposed onto at least a portion of the base adhesive 30 in the cured state 48 (step 510). As discussed previously, the medial buffer layer 34 is included where the base adhesive 30 and the outer adhesive 32 have chemical formulations that may be at least partially incompatible and may result in degradation of one or both of the base and outer adhesives 30, 32. After placement of the medial buffer layer 34, the outer adhesive 32 is disposed over the medial buffer layer 34 (step 512).

According to the various embodiments, as exemplified in FIGS. 1-10 and 12, typically, the outer adhesive 32 extends from an outside edge 84 of the trim breaker 14 to an outside surface 80 of the outer wrapper 18 and also extends from an inside edge 86 of the trim breaker 14 to an inside surface 82 of the inner liner 16. The outer adhesive 32 is then cured (step 514). The outer adhesive 32, once cured, cooperates with the base adhesive 30 and the medial buffer layer 34 to define a composite encapsulation system 10 having the structural adhesive capability and also sealing capability. Each of the base adhesive 30 and the outer adhesive 32 have structural and sealing components that limit permeation of gas 72 and vapor into the insulating cavity 28, even after a failure of one of the base and outer adhesives 30, 32. The combination of the base and outer adhesives 30, 32 defines a greater resistance to permeation of gas 72 and vapor. Accordingly, the outer adhesive 32 may be adapted to include a greater resistance to degradation or delamination during exposure to the outside atmosphere surrounding the cabinet 20 as compared to the base adhesive 30.

Referring again to FIGS. 1-10 and 12, the method 500 includes a step 516 of disposing insulation material 68 within an insulating cavity 28 defined between an inner liner 16 and the outer wrapper 18. The insulation material 68 can be disposed within an insulating cavity 28 during installation of the inner liner 16 and outer wrapper 18. In such an embodiment, the insulation material 68 can be disposed between the inner liner 16 and outer wrapper 18. The inner liner 16, outer wrapper 18 and insulation material 68 can then be disposed as a unit into the channel 12, or channels 12 of the trim breaker 14. It is also contemplated that the insulation material 68 can be disposed around the inner liner 16 after the inner liner 16 has been disposed within the liner channel 40 of the trim breaker 14. The insulation material 68 can then be disposed around the inner liner 16 and the outer wrapper 18 can then be disposed around the insulation material 68 to dispose the insulation material 68 within the insulating cavity 28. The insulation material 68 can also be disposed within the insulating cavity 28 after the composite encapsulation system 10 has been fully formed and cured. In such an embodiment, one of the inner liner 16 and outer wrapper 18 can include an insulation port through which an insulating material can be poured, blown, or otherwise disposed within the insulating cavity 28.

Referring again to FIGS. 1-10 and 12, after installation of the insulation material 68, gas 72 can be expressed from the insulating cavity 28 in the insulation material 68 defined within the insulating cavity 28 (step 518). This expression or expulsion of gas 72 serves to define an at least partial vacuum 74 within the insulating cavity 28. It is contemplated that the base and outer adhesives 30, 32, as well as the medial buffer layer 34, can have some elastic properties, such that the composite encapsulation system 10 permits at least partial movement of the inner liner 16 and outer wrapper 18 while maintaining the hermetic seal between the inner liner 16 and the trim breaker 14 and between the outer wrapper 18 and the trim breaker 14.

According to the various embodiments, it is contemplated that the composite encapsulation system 10 described herein can be incorporated within various appliances 22 and fixtures that utilize a vacuum insulation structure. Such appliances 22 can include, but are not limited to, refrigerators, freezers, coolers, ovens, water heaters, dishwashers, laundry appliances, combinations thereof, and other similar appliances 22 and fixtures disposed within household and commercial settings.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulating member for an appliance cabinet, the insulating member comprising:
   an outer metallic panel;
   an inner metallic panel;
   a trim breaker having a channel that receives at least one of the outer metallic panel and the inner metallic panel; and
   a composite encapsulation system that seals an insulating cavity defined between the outer metallic panel and the inner metallic panel, the composite encapsulation system including a base adhesive and an outer adhesive, wherein the base adhesive defines a structural adhesive component and the outer adhesive defines a sealing adhesive component wherein the base adhesive is an epoxy adhesive.

2. The insulating member of claim 1, wherein the channel includes an outer channel that receives the outer metallic panel and a separate inner channel that receives the inner metallic panel.

3. The insulating member of claim 1, wherein the outer adhesive is capable of being applied after the base adhesive defines a cured state.

4. The insulating member of claim 1, wherein the base adhesive and the outer adhesive are separated by a medial buffer layer and the medial buffer layer prevents contact between the base adhesive and the outer adhesive.

5. The insulating member of claim 4, wherein the outer adhesive is injected over the medial buffer layer.

6. The insulating member of claim 5, wherein the medial buffer layer is a solid member that is disposed over the base adhesive.

7. The insulating member of claim 5, wherein the medial buffer layer is a spray-applied material.

8. The insulating member of claim 5, wherein the base adhesive bonds to a lower surface of the medial buffer layer and the outer adhesive bonds to an upper surface of the medial buffer layer to define the composite encapsulation system as a monolithic adhesive.

9. The insulating member of claim 1, wherein the insulating cavity defines an at least partial vacuum.

10. The insulating member of claim 1, wherein the outer adhesive includes at least one of a silicone adhesive and a polyurethane adhesive.

11. The insulating member of claim 1, wherein an insulation material within the insulating cavity at least partially engages the base adhesive.

12. An insulating structure for an appliance cabinet, the insulating structure comprising:
   an outer metallic panel and an inner metallic panel with an insulating cavity defined therebetween; and
   a trim breaker that includes a composite encapsulation system having a base adhesive and an outer adhesive, wherein the base adhesive defines a structural adhesive component and the outer adhesive defines a sealing adhesive component, wherein the base adhesive and the sealing adhesive are different materials, and wherein the composite encapsulation system seals the insulating cavity defined between the outer metallic panel and the inner metallic panel.

13. The insulating structure of claim 12, wherein the trim breaker includes an outer channel that receives the outer metallic panel and a separate inner channel that receives the inner metallic panel, and wherein the composite encapsulation system is disposed in each of the outer channel and the inner channel.

14. The insulating structure of claim 12, wherein the base adhesive and the outer adhesive are separated by a medial buffer layer and the medial buffer layer prevents contact between the base adhesive and the outer adhesive.

15. The insulating structure of claim 14, wherein the outer adhesive is injected over the medial buffer layer.

16. The insulating structure of claim 15, wherein the medial buffer layer is a solid member that is disposed over the base adhesive.

17. The insulating structure of claim 15, wherein the base adhesive bonds to a lower surface of the medial buffer layer and the outer adhesive bonds to an upper surface of the medial buffer layer to define the composite encapsulation system as a monolithic adhesive.

18. A vacuum insulated structure for an appliance cabinet, the vacuum insulated structure comprising:
   an outer metallic panel and an inner metallic panel;
   a trim breaker that extends between the outer metallic panel and the inner metallic panel to define an insulating cavity, wherein a partial vacuum is defined within the insulating cavity, and wherein the trim breaker includes an outer channel that receives the outer metallic panel and includes an inner channel that receives the inner metallic panel; and
   a composite encapsulation system disposed within each of the outer channel and the inner channel, the composite encapsulation system sealing the insulating cavity, wherein the composite encapsulation system including a base adhesive and an outer adhesive, wherein the base adhesive and the outer adhesive are different materials, and wherein the base adhesive defines a structural adhesive component and the outer adhesive defines a sealing adhesive component.

19. The vacuum insulated structure of claim 18, wherein the base adhesive and the outer adhesive are separated by a medial buffer layer and the medial buffer layer prevents contact between the base adhesive and the outer adhesive.

20. The vacuum insulated structure of claim 19, wherein the base adhesive bonds to a lower surface of the medial buffer layer and the outer adhesive bonds to an upper surface of the medial buffer layer to define the composite encapsulation system as a monolithic adhesive.

* * * * *